(12) United States Patent
Morey

(10) Patent No.: US 6,955,310 B1
(45) Date of Patent: Oct. 18, 2005

(54) REMOTE CONTROL ASSEMBLY FOR WOOD CHIPPER

(75) Inventor: Michael Boyd Morey, Shepherd, MI (US)

(73) Assignee: Tramor, Inc., Remus, MI (US)

( * ) Notice: Subject to any disclaimer, the term of this patent is extended or adjusted under 35 U.S.C. 154(b) by 178 days.

(21) Appl. No.: 10/270,888

(22) Filed: Oct. 15, 2002

Related U.S. Application Data

(63) Continuation-in-part of application No. 10/152,550, filed on May 21, 2002, now Pat. No. 6,729,567.

(51) Int. Cl.[7] .......................... B02C 11/08; B02C 17/02
(52) U.S. Cl. ......................... 241/34; 241/92; 144/430
(58) Field of Search ............................ 241/34, 36, 92, 241/280, 282; 144/430, 181, 248.5

(56) References Cited

U.S. PATENT DOCUMENTS

| | | |
|---|---|---|
| 190,675 A | 5/1877 | Gaines |
| 589,236 A | 8/1897 | Williams |
| 604,283 A | 5/1898 | Albrecht |
| 1,266,894 A | 5/1918 | Williams |
| 1,713,507 A | 5/1929 | Ammon |
| 1,752,290 A | 4/1930 | Ammon |
| 1,889,129 A | 11/1932 | Nielsen |
| 1,959,465 A | 5/1934 | Dryfoos |
| 2,026,790 A | 1/1936 | Mankoff |
| 2,128,194 A | 8/1938 | Sheldon |
| 2,244,577 A | 6/1941 | Schreiber |
| 2,318,219 A | 5/1943 | Harris |
| 2,392,958 A | 1/1946 | Tice |
| 2,658,318 A | 11/1953 | Miller |
| 2,663,505 A | 12/1953 | Sennholtz |
| 2,678,169 A | 5/1954 | Tullis |
| 2,710,635 A | 6/1955 | Alexander |
| 2,837,290 A | 6/1958 | Nagel |
| 2,863,476 A | 12/1958 | Clark |
| 2,864,420 A | 12/1958 | Schmidt |
| 3,030,037 A | 4/1962 | Raetz |
| 3,069,101 A | 12/1962 | Wexell |
| 3,076,489 A | 2/1963 | Schmidt et al. |
| 3,182,917 A | 5/1965 | Tamny et al. |
| 3,254,687 A | 6/1966 | Tertyshnikov |
| 3,276,700 A | 10/1966 | Eklund |
| 3,367,585 A | 2/1968 | Ratkowski |
| 3,436,028 A | 4/1969 | Koehnen et al. |
| 3,463,405 A | 8/1969 | Shepherd |
| 3,509,924 A | 5/1970 | Newhouse, Jr. |
| 3,559,724 A | 2/1971 | Wilkinson |
| 3,635,410 A | 1/1972 | Smith |
| 3,642,214 A | 2/1972 | Blackwell, Jr. |
| 3,844,494 A | 10/1974 | Hightower |
| 3,868,062 A | 2/1975 | Cunningham et al. |

(Continued)

FOREIGN PATENT DOCUMENTS

| | | | |
|---|---|---|---|
| DE | 36 24 996 A1 | 2/1988 | |
| DE | 38 08 487 C1 | 5/1989 | |
| DE | 29917342 | * 5/2000 | ........... B27L 11/00 |
| WO | 98/15395 | * 4/1998 | ........... B27L 11/00 |

*Primary Examiner*—Ed Tolan
(74) *Attorney, Agent, or Firm*—Bliss McGlynn, P.C.

(57) ABSTRACT

A remote control assembly for an infeed area of a wood chipper includes an infeed mechanism(s) associated with the infeed area of the wood chipper and a control system operatively connected to the infeed mechanism(s). The remote control assembly also includes a receiver connected to the control system for receiving a signal and activating the infeed mechanism(s).

18 Claims, 7 Drawing Sheets

U.S. PATENT DOCUMENTS

| | | |
|---|---|---|
| 3,907,016 A | 9/1975 | Nicholson et al. |
| 3,907,216 A | 9/1975 | MacKissic et al. |
| 3,936,004 A | 2/1976 | Graf et al. |
| 3,939,886 A | 2/1976 | Tucek |
| 3,989,198 A | 11/1976 | Blasko |
| 4,022,021 A | 5/1977 | Russell, Jr. |
| 4,074,594 A | 2/1978 | Dall et al. |
| 4,077,450 A | 3/1978 | Ackerman |
| 4,117,985 A | 10/1978 | Lazareck |
| 4,129,260 A | 12/1978 | Baker |
| 4,146,184 A | 3/1979 | Whitney |
| 4,162,769 A | 7/1979 | Lapointe |
| 4,168,035 A | 9/1979 | Palm et al. |
| 4,260,114 A | 4/1981 | Herder |
| 4,452,400 A | 6/1984 | Williams |
| 4,504,019 A | 3/1985 | Newell et al. |
| 4,527,604 A | 7/1985 | Everett |
| 4,544,104 A | 10/1985 | Carlsson |
| 4,560,110 A | 12/1985 | Burda |
| 4,598,745 A | 7/1986 | Parviainen |
| 4,685,624 A | 8/1987 | Nidiffer et al. |
| 4,687,179 A | 8/1987 | Smith |
| 4,692,028 A | 9/1987 | Schave |
| 4,702,424 A | 10/1987 | Widlak |
| 4,716,823 A | 1/1988 | Capdevila |
| 4,717,083 A | 1/1988 | Quast et al. |
| 4,721,257 A | 1/1988 | Williams et al. |
| 4,793,561 A | 12/1988 | Burda |
| 4,796,819 A | 1/1989 | Waterman |
| 4,850,406 A | 7/1989 | Krautzberger |
| 4,872,500 A | 10/1989 | Duffey et al. |
| 4,906,486 A | 3/1990 | Young |
| 4,915,310 A | 4/1990 | Stelk |
| 4,917,314 A | 4/1990 | Manschwetus |
| 4,922,977 A | 5/1990 | Colton et al. |
| 4,967,969 A | 11/1990 | Griffith, III |
| 4,982,904 A | 1/1991 | Greiner |
| 5,005,620 A | 4/1991 | Morey |
| 5,018,672 A | 5/1991 | Peck et al. |
| 5,042,727 A | 8/1991 | Plante |
| 5,044,567 A | 9/1991 | Hausler et al. |
| 5,078,328 A | 1/1992 | Willingham |
| 5,088,532 A | 2/1992 | Eggers et al. |
| RE33,840 E | 3/1992 | Peterson et al. |
| 5,114,085 A | 5/1992 | Inui |
| 5,167,374 A | 12/1992 | Strohmeyer |
| 5,205,496 A | 4/1993 | O'Donnell et al. |
| 5,209,278 A | 5/1993 | Carpenter et al. |
| 5,263,651 A | 11/1993 | Nadarajah |
| 5,285,974 A | 2/1994 | Cesarini |
| 5,358,189 A | 10/1994 | Vandermolen |
| 5,362,004 A | 11/1994 | Bateman |
| 5,372,316 A | 12/1994 | Bateman |
| 5,377,919 A | 1/1995 | Rogers et al. |
| 5,413,286 A | 5/1995 | Bateman |
| 5,474,239 A | 12/1995 | Williams, Jr. et al. |
| 5,480,098 A * | 1/1996 | Doppstadt .............. 241/101.76 |
| 5,526,988 A | 6/1996 | Rine |
| 5,667,152 A | 9/1997 | Mooring |
| 5,692,548 A | 12/1997 | Bouwers et al. |
| 5,746,261 A * | 5/1998 | Bowling ................... 144/24.12 |
| 5,845,689 A * | 12/1998 | Egging et al. .............. 144/334 |
| 5,921,071 A * | 7/1999 | Paquet et al. ................ 56/16.6 |
| 5,988,539 A | 11/1999 | Morey |
| 6,000,642 A | 12/1999 | Morey |
| 6,014,996 A * | 1/2000 | Egging et al. .............. 144/334 |
| 6,016,855 A | 1/2000 | Morey |
| 6,032,707 A | 3/2000 | Morey et al. |
| 6,036,125 A | 3/2000 | Morey et al. |
| 6,293,479 B1 | 9/2001 | Kaczmarski et al. |
| 6,357,684 B1 | 3/2002 | Morey |
| 6,408,906 B1 * | 6/2002 | Moon et al. .............. 144/24.13 |
| 6,446,889 B1 * | 9/2002 | Moore ........................ 241/92 |

* cited by examiner

REMOTE CONTROL ASSEMBLY FOR WOOD CHIPPER

CROSS-REFERENCE TO RELATED APPLICATION(S)

The present application is a continuation-in-part of U.S. patent application Ser. No. 10/152,550, now U.S. Pat. No. 6,729,567 filed May 21, 2002.

BACKGROUND OF THE INVENTION

1. Field of the Invention

The present invention relates generally to wood chippers and, more particularly, to a remote control assembly for a wood chipper.

2. Description of the Related Art

It is known to provide a wood chipper for chipping wood such as brush, branches, and the like to produce wood chips. An example of such a wood chipper is disclosed in U.S. Pat. No. 5,988,539 to Morey. In this patent, the wood chipper includes an infeed hopper, primary feed wheel assembly, and a cutting assembly having a rotatable disc or drum with at least one knife or blade for chipping the wood entering the wood chipper and reducing it to wood chips. Typically, the primary feed wheel assembly includes a stationary lower primary feed wheel connected to a lower housing and a movable upper primary feed wheel connected to an upper housing movable relative to the lower housing for allowing wood to enter the cutting assembly. The primary feed wheel assembly may include a spring interconnecting the upper housing and the lower housing to urge the upper primary feed wheel toward the lower primary feed wheel to apply a spring force against the wood entering between the primary feed wheels to feed the wood to the cutting assembly.

It is also known to provide a winch assembly for a wood chipper to assist in pulling long lengths of wood material to the infeed hopper of the wood chipper. The winch assembly typically includes a housing connected to the infeed hopper. The winch assembly also includes a hydraulic motor having a cable attached thereto extending through the housing for connection to the wood material.

It is desirable to provide remote controls for a wood chipper to reduce operator physical involvement in operating the wood chipper. It is also desirable to provide remote controls for a wood chipper to operate components of an infeed area of the wood chipper. It is further desirable to provide remote controls for a wood chipper to operate a side feed wheel(s) and/or winch and/or top wheel lift cylinder of the wood chipper. Therefore, there is a need in the art to provide a remote control assembly for a wood chipper that meets these desires.

SUMMARY OF THE INVENTION

Accordingly, the present invention is a remote control assembly for an infeed area of a wood chipper including an infeed mechanism(s) associated with the infeed area of the wood chipper. The remote control assembly also includes a control system operatively connected to or near the infeed mechanism(s). The remote control assembly further includes a receiver connected to the control system for receiving a signal and activating the infeed mechanism(s).

One advantage of the present invention is that a remote control assembly is provided for a wood chipper. Another advantage of the present invention is that the remote control assembly may be used to actuate one or more side feed wheel assembly that aligns feeding of the wood material to the primary feed wheels. Yet another advantage of the present invention is that the remote control assembly may be used to actuate a winch assembly that pulls wood material to the infeed hopper. Still another advantage of the present invention is that the remote control assembly allows for operating components of the infeed area on wood chippers. A further advantage of the present invention is that the remote control assembly may be used to activate a cylinder to actuate a top feed wheel.

Other features and advantages of the present invention will be readily appreciated, as the same becomes better understood, after reading the subsequent description when taken in conjunction with the accompanying drawings.

DESCRIPTION OF THE PREFERRED EMBODIMENT(S)

Figure 1:
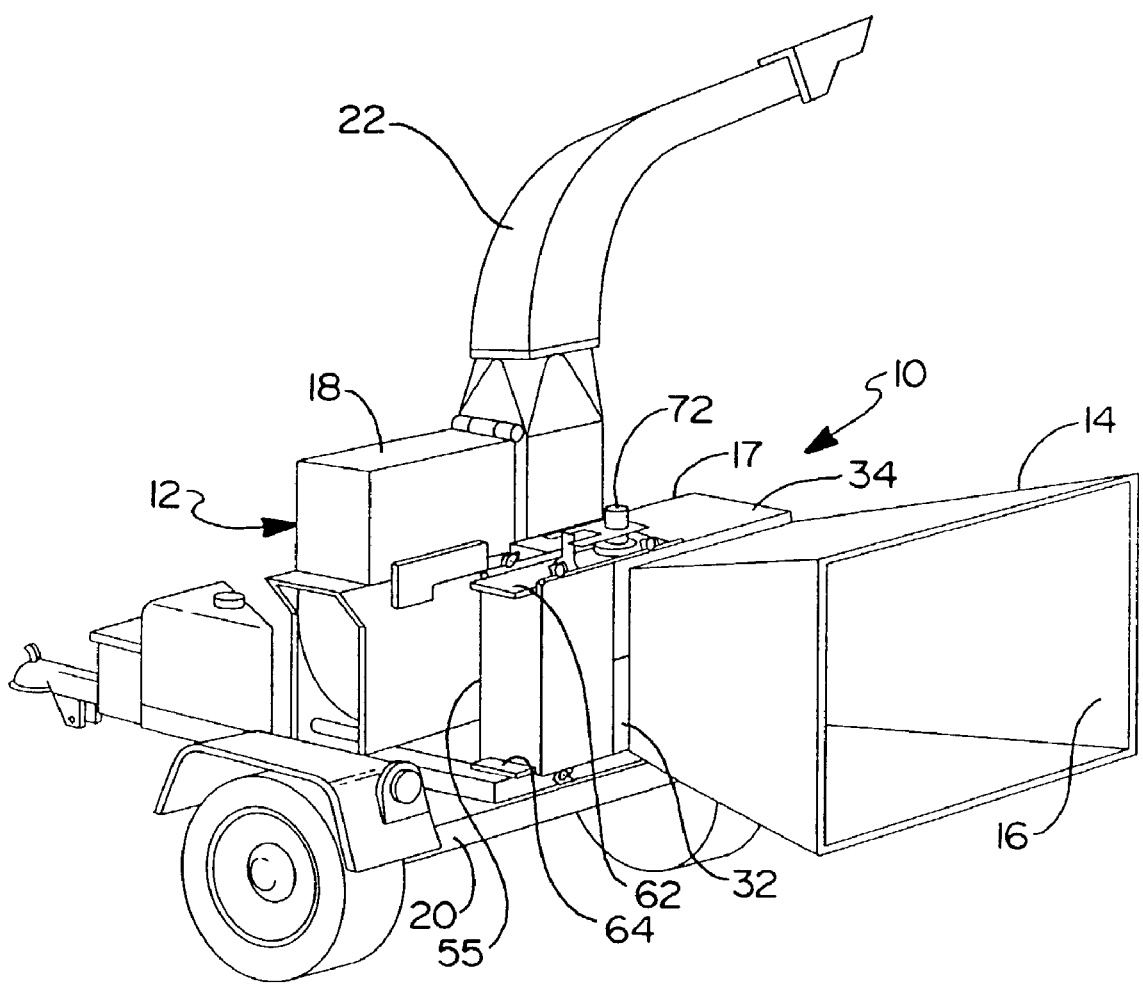
FIG. 1 is a perspective view of a side feed wheel assembly, according to the present invention, illustrated in operational relationship with a wood chipper.

Referring now to the drawings and in particular FIGS. 1 through 6B, one embodiment of a side feed wheel assembly 10, according to the present invention, is shown for a wood chipper, generally indicated at 12. The wood chipper 12 includes an infeed hopper assembly 14 having an inlet 16 to allow wood material to enter the wood chipper 12. The wood chipper 12 also includes a primary feed wheel assembly 17 disposed between and adjacent to the infeed hopper assembly 14 and a cutting assembly 18 for rotation about a horizontal axis adjacent to the primary feed wheel assembly 17. The primary feed wheel assembly 17 is used for pulling and pushing the wood material from the infeed hopper assembly 14 to the cutting assembly 18. The cutting assembly 18 includes a rotatable disc or drum (not shown) having a plurality of blades (not shown) operatively connected to the disc or drum for chipping the wood material. The side feed wheel assembly 10 is used to push or feed wood material to the primary feed wheels of the primary feed wheel assembly 17.

The wood chipper 12 includes an engine (not shown) mounted on a frame 20 and coupled to the primary feed wheel assembly 17 and cutting assembly 18 by suitable means to cause rotation of the primary feed wheels 36 to be described and the disc or drum. The wood chipper 12 includes a rotatable shaft (not shown) operatively connected to the disc or drum of the cutting assembly 18 and a pulley (not shown) disposed about one end of the shaft. The wood chipper 12 also includes a rotatable shaft (not shown) operatively connected to the engine and a pulley (not shown) disposed about the shaft (not shown). The wood chipper 12 further includes a belt or belts (not shown) disposed over and interconnecting the pulleys. It should be appreciated that the engine rotates the disc or drum of the cutting assembly 18 and a pump 84 (FIG. 7) pumps hydraulic fluid to rotate the primary feed wheels 36 to be described of the primary feed wheel assembly 17.

The wood chipper 12 includes an outlet or discharge chute 22 operatively connected to the cutting assembly 18. The discharge chute 22 is generally tubular and may be circular or rectangular in cross-sectional shape. The discharge chute 22 extends upwardly and away. It should be appreciated that the discharge chute 22 may have any suitable cross-sectional shape.

Referring to FIGS. 1 through 6B, the primary feed wheel assembly 17 includes a housing, generally indicated at 30. The housing 30 includes a first or lower housing 32 having a generally rectangular shape. The lower housing 32 is stationary and connected to the cutting assembly 18 by suitable means such as welding. The lower housing 32 has an inlet (not shown) on one side to receive wood material from the infeed hopper assembly 14 and an outlet (not shown) on the other side to discharge wood material to the cutting assembly 18. It should also be appreciated that the lower housing 32 may have any suitable cross-sectional shape.

The housing 30 also includes a movable second or upper housing 34 disposed over the lower housing 32 and slidable relative to the lower housing 32. The upper housing 34 is generally rectangular in shape with a generally inverted U shape cross-section to enclose or cover the lower housing 32. The upper housing 34 has an inlet (not shown) on one side to receive wood material from the infeed hopper assembly 14 and an outlet (not shown) on the other side to discharge wood material to the cutting assembly 18. It should be appreciated that the upper housing 34 may have any suitable cross-sectional shape.

The primary feed wheel assembly 17 also includes a plurality of rotatable primary feed wheels 36 disposed in the housing 30. In a preferred embodiment, the primary feed wheels 36 are two primary feed wheels 36a and 36b. Preferably, the primary feed wheels 36a and 36b are orientated horizontally to rotate about a horizontal axis. The primary feed wheel 36a is a lower primary feed wheel, which is supported by the lower housing 32. The primary feed wheel 36b is an upper primary feed wheel, which is supported by the upper housing 34. The lower primary feed wheel 32a and upper primary feed wheel 32b form a pair of the primary feed wheels 36 and the upper primary feed wheel 36b is spaced vertically from the lower primary feed wheel 36a. The lower primary feed wheel 36a is rotatably supported on the lower housing 32 by a pair of opposed bearings (not shown). The bearings are secured to the lower housing 32 by suitable means such as fasteners (not shown). It should be appreciated that the lower primary feed wheel 36a is disposed within the lower housing 32 and supported by the bearings to rotate relative to the housing 30.

The upper primary feed wheel 36b is rotatably supported on the upper housing 34 by a pair of opposed bearings (not shown). The bearings are secured to the upper housing 34 by suitable means such as fasteners (not shown). It should be appreciated that the upper primary feed wheel 36b is disposed within the upper housing 34 and supported by the bearings to rotate relative to the housing 30. It should also be appreciated that one end of the primary feed wheels 36a and 36b are operatively connected to the engine of the wood chipper 12 by suitable means such as a hydraulic pump 84 (FIG. 7) which pumps fluid to drive hydraulic motors 36c and 36d to rotate the primary feed wheels 36a and 36b. It should be appreciated that the wood chipper 12 may have a hydraulic yoke cylinder 38 (FIG. 7) connected to the hydraulic pump 84 and the upper housing 34 to allow an operator to slidably raise and lower the upper housing 34 relative to the lower housing 32. It should also be appreciated that, in other embodiments, the primary feed wheels 36 may be located horizontally, vertically, or diagonally for the primary feed wheel assembly 17.

Referring to FIGS. 1 through 6B, the-side feed wheel assembly 10 includes a side housing 55 connected to the housing 30. The side housing 55 has a generally rectangular shape. The side housing 55 is stationary and connected to the housing 30 by suitable means such as welding. The side housing 55 has an opening (not shown) on one side communicating with an interior of the infeed hopper assembly 14. It should also be appreciated that the side housing 55 may have any suitable cross-sectional shape.

The side feed wheel assembly 10 also includes at least one, preferably a plurality of slide bars or tracks 58 for a function to be described. The tracks 58 are generally cylindrical in shape with a generally circular cross-sectional shape. The tracks 58 extend transversely and are located at the upper and lower front and rear edges of the side housing 55. The tracks 58 are connected to the side housing 55 by suitable means such as welding. It should be appreciated that slide bars (not shown) may be used in place of the tracks 58 for sliding movement to be described.

The side feed wheel assembly 10 includes at least one, preferably a plurality of slides or rollers 60 to cooperate with the tracks 58 for sliding or rolling movement therealong. The rollers 60 are rotatably mounted to an upper plate 62 and lower plate 64 by suitable means such as brackets 66. The plates 62 and 64 are generally rectangular in shape and are disposed between the tracks 58. Preferably, a pair of rollers 60 is located at each front and rear edge of each plate 62 and 64 and spaced transversely therealong. It should be appreciated that the rollers 60 support the plates 62 and 64 on the tracks 58 and that the rollers 60 move the plates 62 and 64 relative to the tracks 58. It should also be appreciated that the rollers 60 are conventional and known in the art. It should further be appreciated that slides (not shown) could be used with slide bars (not shown).

The side feed wheel assembly 10 further includes at least one side feed wheel 68 to urge wood material toward the primary feed wheels 36. In a preferred embodiment, the side feed wheel 68 is a single feed wheel. The side feed wheel 68 is generally cylindrical in shape with a generally circular cross-sectional shape. The side feed wheel 68 may include at least one, preferably a plurality of teeth 70 extending axially and spaced circumferentially. Preferably, the side feed wheel 68 is orientated vertically to rotate about a vertical axis. The side feed wheel 68 is rotatably supported on the upper and lower plates 62 and 64 by a pair of opposed bearings (not shown). The bearings are secured to the upper plate 62 and lower plate 64 by suitable means such as fasteners (not shown). It should be appreciated that the side feed wheel 68 is disposed within the side housing 55 and supported between the plates 62 and 64 by the bearings to rotate relative to the plates 62 and 64 and the side housing 55. It should also be appreciated that the side feed wheel 68 may be orientated on an angle relative to a vertical axis. It should yet be appreciated that the teeth 70 on the side feed wheel 68 are optional. It should further be appreciated that the side feed wheel 68 could be a variety of diameters and lengths. It should still further be appreciated that a plurality of side feed wheels 68 may be used.

The side feed wheel assembly 10 may include a hydraulic motor 72 connected to one end of the side feed wheel 68 to rotate the side feed wheel 68. The hydraulic motor 72 is operatively connected by suitable means to the hydraulic pump 84 (FIG. 7), which pumps fluid to drive the hydraulic motor 72. It should be appreciated that, in other embodiments, the hydraulic motor 72 could be replaced and the side feed wheel 68 could be electric or pneumatic powered. It should also be appreciated that the side feed wheel 68 could also freewheel in rotation. It should further be appreciated that the hydraulic motor 72 is conventional and known in the art.

The side feed wheel assembly 10 includes an actuator 74, for example a cylinder, for moving the side feed wheel 68 left and right relative to the primary feed wheels 36. The actuator 74 may be of a hydraulic type having a cylinder 76 with one end connected to housing 30 by suitable means such as a bracket and fastener and a rod 78 with one end connected to the lower plate 64 by suitable means such as a bracket and fastener. The other end of the rod 78 is connected to a piston 79 (FIG. 7) slidably disposed in the cylinder 76 and the cylinder 76 is connected by suitable means (not shown) to the hydraulic pump 84, which pumps fluid to drive the piston 79 in the cylinder 76. It should be appreciated that, in other embodiments, the actuator 74 could be electric, spring, or pneumatic powered. It should also be appreciated that the actuator 74 slides the plates 62 and 64 and the side feed wheel 68 left and right for horizontal movement. It should further be appreciated that the actuator 74 is conventional and known in the art.

In operation of the wood chipper 12, the engine rotates the cutting assembly 18 and hydraulically rotates the primary feed wheels 36a and 36b of the primary feed wheel assembly 17. Wood is fed into the inlet 16 of the infeed hopper assembly 14 by an operator and is contacted by the primary feed wheels 36a and 36b. The wood is fed by the primary feed wheels 36a and 36b to the cutting assembly 18. As the cutting assembly 18 rotates and contacts the wood, the wood is cut or chipped into wood chips, which move through the outlet of the cutting assembly 18 and are expelled out of the discharge chute 22.

Figure 2:
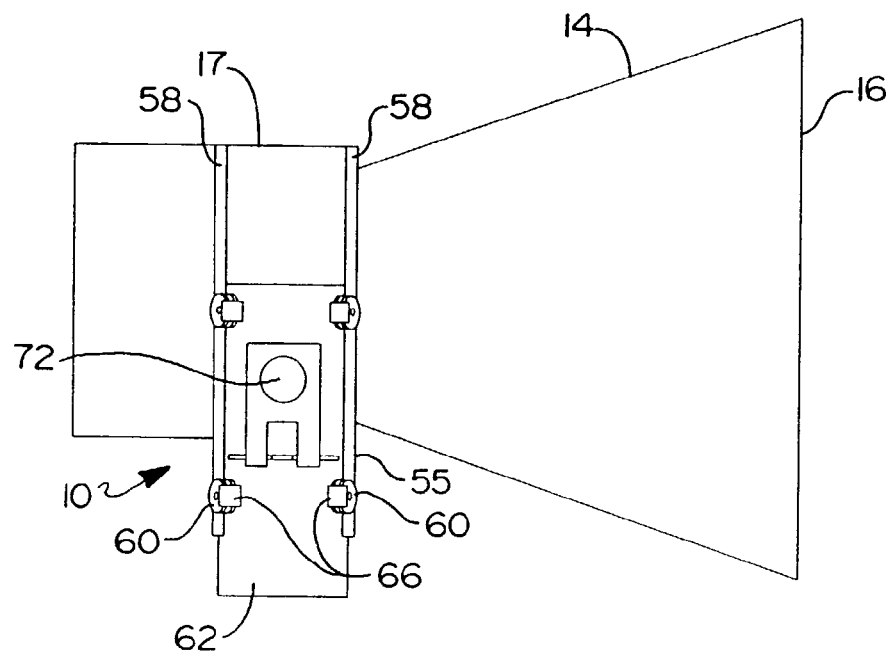
FIG. 2 is a plan view of the side feed wheel assembly of FIG. 1 illustrating a first operative position.
Figure 3:
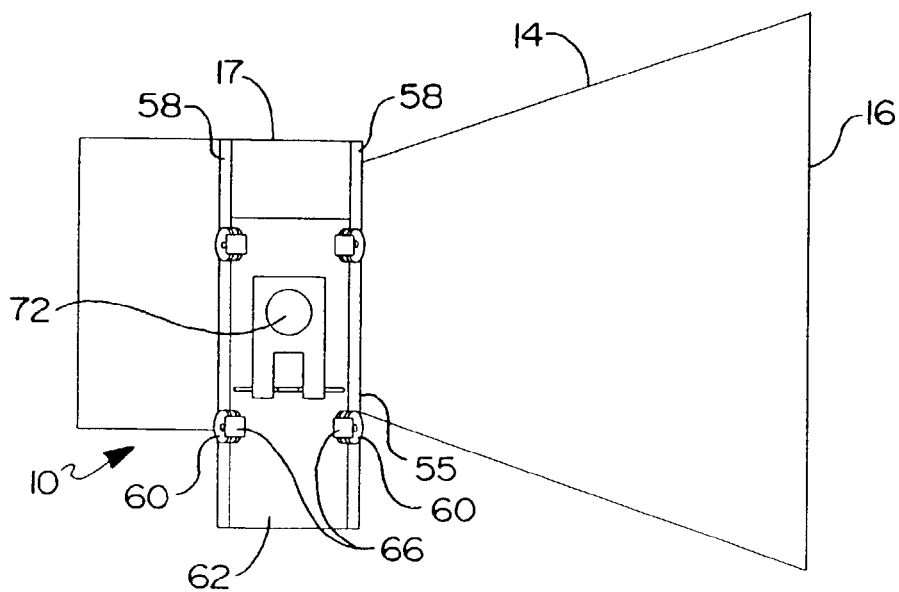
FIG. 3 is a view similar to FIG. 2 of the side feed wheel assembly illustrating in a second operative position.
Figure 4:
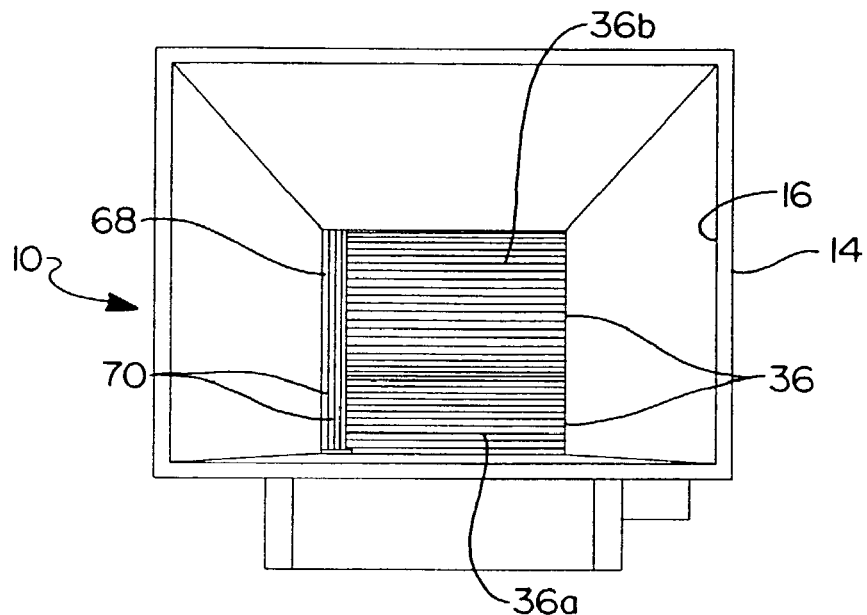
FIG. 4 is a front elevational view of the side feed wheel assembly of FIG. 1 illustrating a first operative position.
Figure 5:
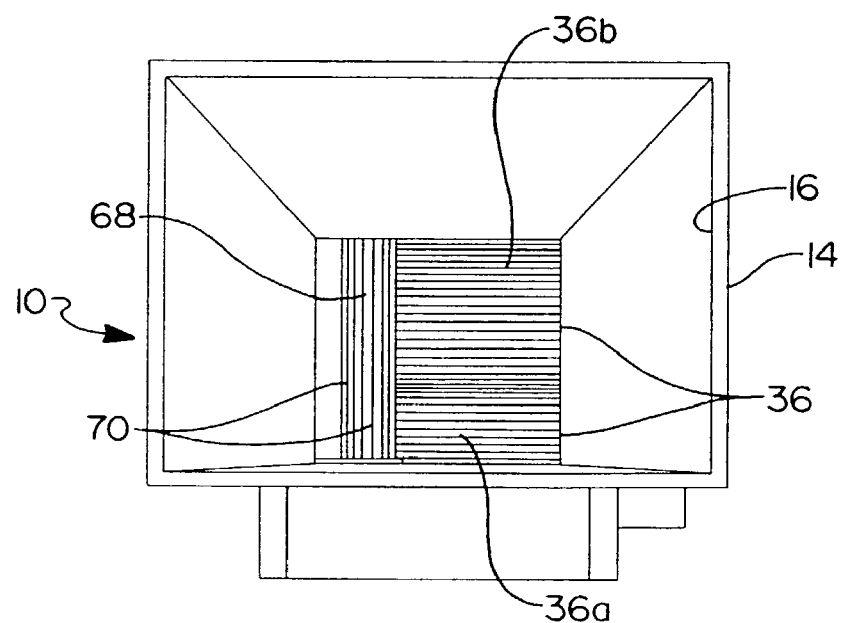
FIG. 5 is a view similar to FIG. 4 of the side wheel feed wheel assembly illustrating a second operative position.
Figure 6A:
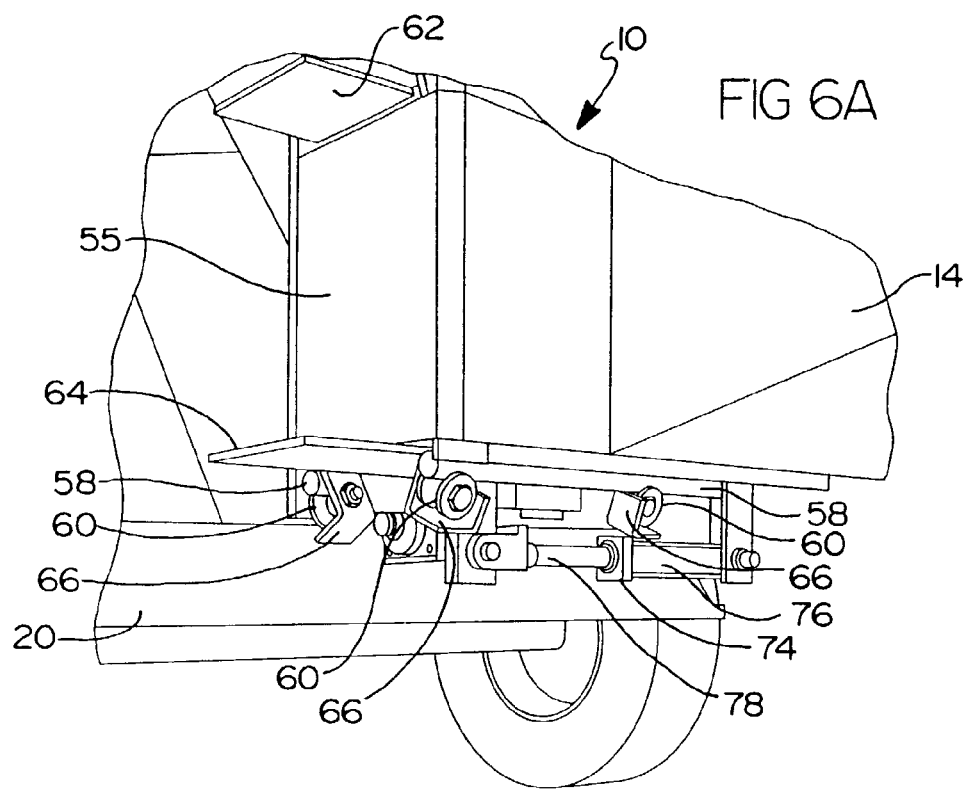
FIGS. 6A and 6B are side perspective views of the side feed wheel assembly of FIG. 1.
Figure 6B:
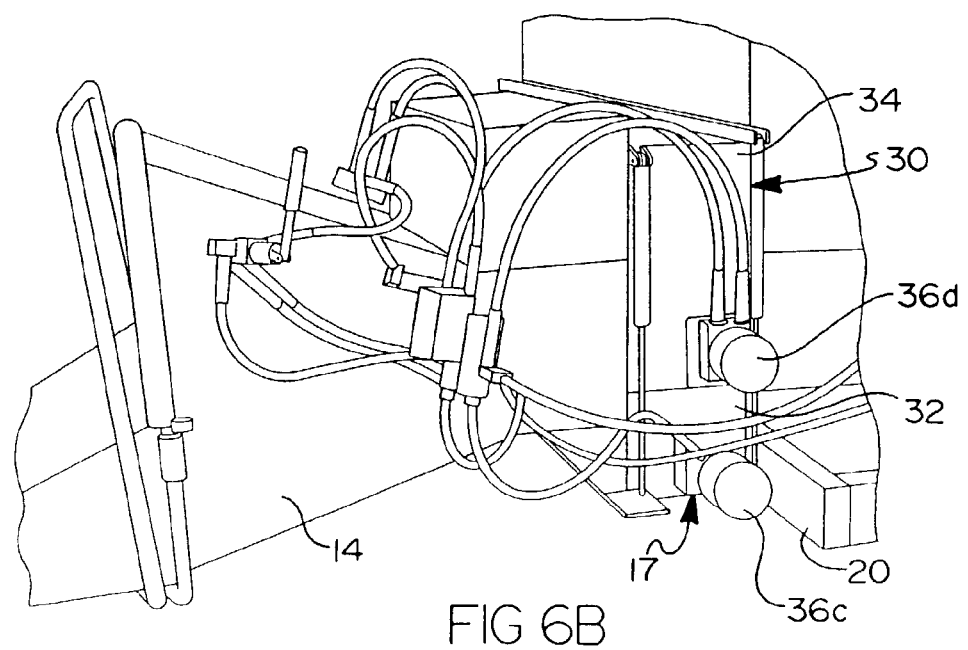

In operation of the side feed wheel assembly 10, the engine hydraulically rotates the side feed wheel 68. As the wood fed into the inlet 16 contacts the primary feed wheels 36a and 36b, it may move to the side of the infeed hopper assembly 14 and contact the side feed wheel 68. The operator moves a lever (not shown) which can hydraulically actuate the actuator 74 to move or slide the plates 62 and 64 and side feed wheel 68 via the rollers 60 and tracks 58 toward the primary feed wheels 36 as illustrated in FIGS. 3 and 5. The movement of the side feed wheel 68, in turn, moves the wood material away from the side of the infeed hopper assembly 14 and aligns the wood material with the primary feed wheels 36. The rotation of the side feed wheel 68, in turn, moves or feeds the wood material toward the primary feed wheels 36. When the operator releases or counter-moves the lever, the actuator 74 moves or returns the plates 62 and 64 and side feed wheel 68 via the rollers 60 and tracks 58 away from the primary feed wheels 36 as illustrated in FIGS. 2 and 4. It should be appreciated that, when the side feed wheel 68 moves left and right, the side feed wheel 68 may be designed to move a variety of distances. It should also be appreciated that the side feed wheel 68 may be located anywhere between the outlet or rim of the infeed hopper assembly 14 and the cutting assembly 18. It should further be appreciated that the side feed wheel assembly 10 may be located on either or both the left side and right side of the infeed hopper assembly 14. It should still further be appreciated that the side feed wheel assembly 10 can be used to retrofit exiting wood chippers or manufactured as original equipment on wood chippers.

Figure 7:
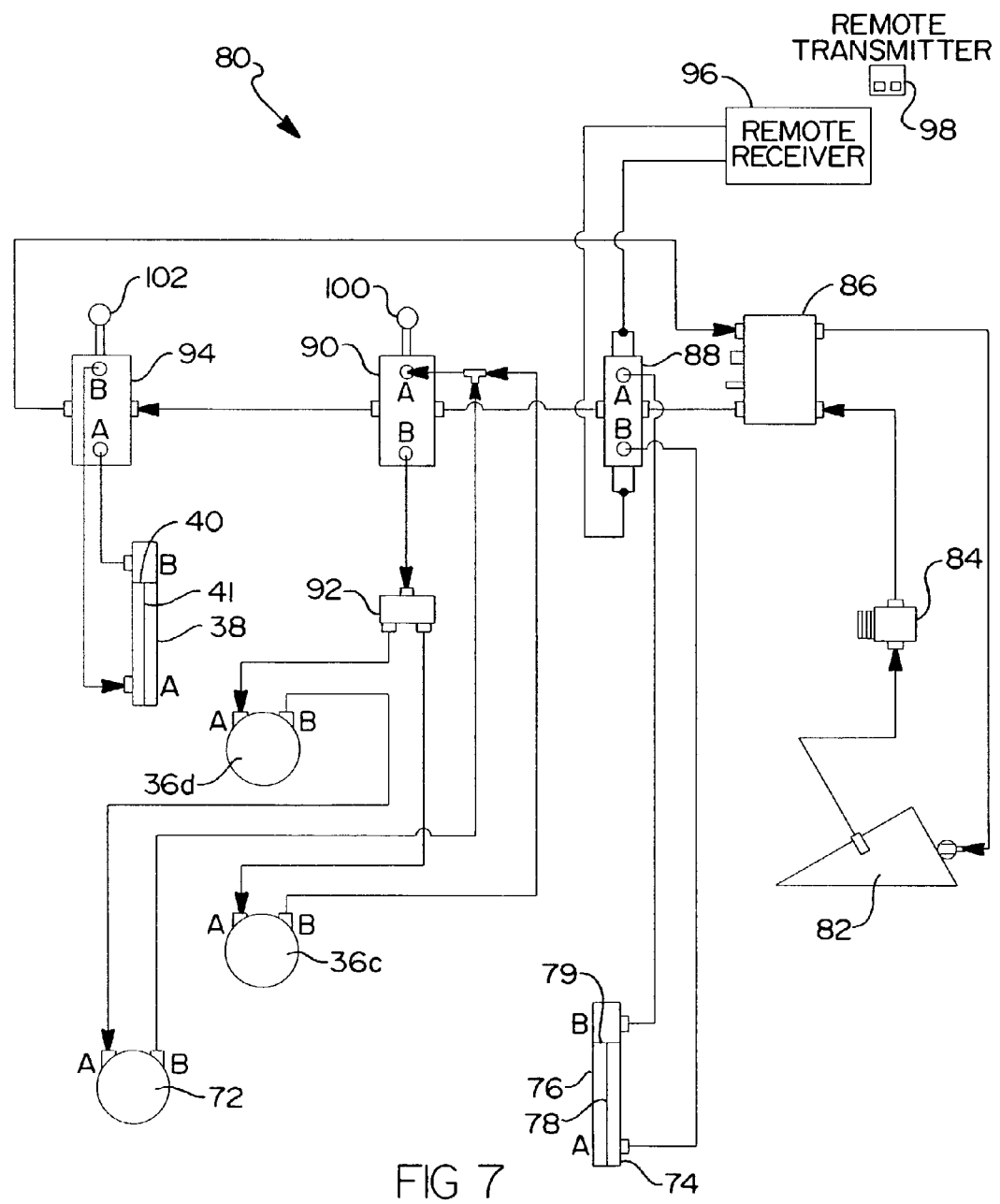
FIG. 7 is a schematic view of a control system, according to the present invention, of the side feed wheel assembly of FIG. 1.

Referring to FIG. 7, the side feed wheel assembly 10 includes a control system, generally indicated at 80, to control the movement of the primary feed wheels 36, the side feed wheel 68, and the yoke lift 38. The control system 80 includes a storage tank 82 containing hydraulic fluid having an inlet port and an outlet port. The control system 80 further includes a hydraulic pump 84 having an inlet port and an outlet port. The outlet port of the storage tank 82 is fluidly connected to the inlet port of the hydraulic pump 84. It should be appreciated that a pressure relief mechanism (not shown) can be disposed along a fluid supply line as needed.

The control system 80 includes a feed block 86 fluidly connected to the outlet port of the hydraulic pump 84 and to the inlet port of the storage tank 82. The control system 80 also includes a side feed wheel actuator block 88 fluidly connected to the outlet port of the feed block 86 and to each end of the cylinder 76 of the actuator 74 for the side feed wheel 68. It should be appreciated that the actuator block 88 controls fluid flow to the ends of the cylinder 76 for moving the piston therein 79 and the side feed wheel 68 attached thereto via the rod 78.

The control system 80 includes a feed wheel motor block 90 fluidly connected to the actuator block 88. The control system 80 further includes a flow divider 92 fluidly connected to the motor block 90 and each of the hydraulic motors 36c and 36d. It should be appreciated that a return line from the hydraulic motors 36c and 36d is fluidly connected to the motor block 90.

The control system 80 includes a yoke lift block 94 fluidly connected to the motor block 90 and to each end of the cylinder 38 for the yoke lift. It should be appreciated that the yoke lift block 94 controls fluid flow to the ends of the cylinder 38 for moving the piston 40 therein and the yoke (not shown) attached thereto via the rod 41. It should be appreciated that pressurized fluid from the hydraulic pump 84 flows through supply lines to the hydraulic motors 36c,36d, and returns to the storage tank 82 through return lines. It also should be appreciated that the flow divider 72 divides the fluid flow between hydraulic motors 36c and 36d.

As illustrated in FIG. 7, the control system 80 includes a receiver 96 electrically connected to the actuator block 88 and to a source of power (not shown). The control system 80 also includes a transmitter 98, having a source of power (not shown) to send a signal, for example a radio frequency, to the receiver 96. It should be appreciated that the transmitter 98 is of a remote type and could be of a hand-held type, push button type, tether type, etc., to activate the control system 80 to operate components on the infeed area of the wood chipper 12.

In operation of the control system 80, the engine rotates the pump 84 and the pump 84 hydraulically pumps fluid from the storage tank 82 to the feed block 86, which is fed to the actuator block 88, motor block 90, and yoke lift block 94. The operator moves a lever 100 on the actuator block 90 to allow fluid flow to the hydraulic motors 36c,36d,74 to rotate the primary feed wheels 36 of the primary feed wheel assembly 17 and the side feed wheel 68 of the side feed wheel assembly 10. Wood is fed into the inlet 16 of the infeed hopper assembly 14 by an operator and is contacted by the primary feed wheels 36a and 36b. The wood is fed by the primary feed wheels 36a and 36b to the cutting assembly 18. As the cutting assembly 18 rotates and contacts the wood, the wood is cut or chipped into wood chips, which move through the outlet of the cutting assembly 18 and are expelled out of the discharge chute 24. It should be appreciated that the operator moves a lever 102 on the yoke lift block 94 to allow fluid flow to one end of the cylinder 38 to allow an operator to slidably raise and lower the upper housing 34 relative to the lower housing 32.

As the wood fed into the inlet 16 contacts the primary feed wheels 36a and 36b, it may move to the side of the infeed hopper assembly 14 and contact the side feed wheel 68. The operator uses the transmitter 98 to transmit a signal, which is received by the receiver 96. The receiver 96 sends an electrical signal to the actuator block 88 and activates a solenoid (not shown) therein to allow fluid flow to one end of the cylinder 76 of the actuator 74 to move or slide the side feed wheel 68 toward the primary feed wheels 36. The movement of the side feed wheel 68, in turn, moves the wood material away from the side of the infeed hopper assembly 14 and aligns the wood material with the primary feed wheels 36. When the operator uses the transmitter 98 to transmit another signal, which is received by the receiver 96, the receiver 96 sends another electrical signal to the actuator block 88 and activates the solenoid. The solenoid allows fluid flow to the other end of the cylinder 76 of the actuator 74 to move or return the side feed wheel 68 away from the primary feed wheels 36. It should be appreciated that the operator may manually or physically operate a lever or switch to send an electrical signal to the actuator block 88 and activate a solenoid (not shown) therein to allow fluid flow to one end of the cylinder 76 of the actuator 74 to move or slide the side feed wheel 68 toward the primary feed wheels 36.

Figure 8:
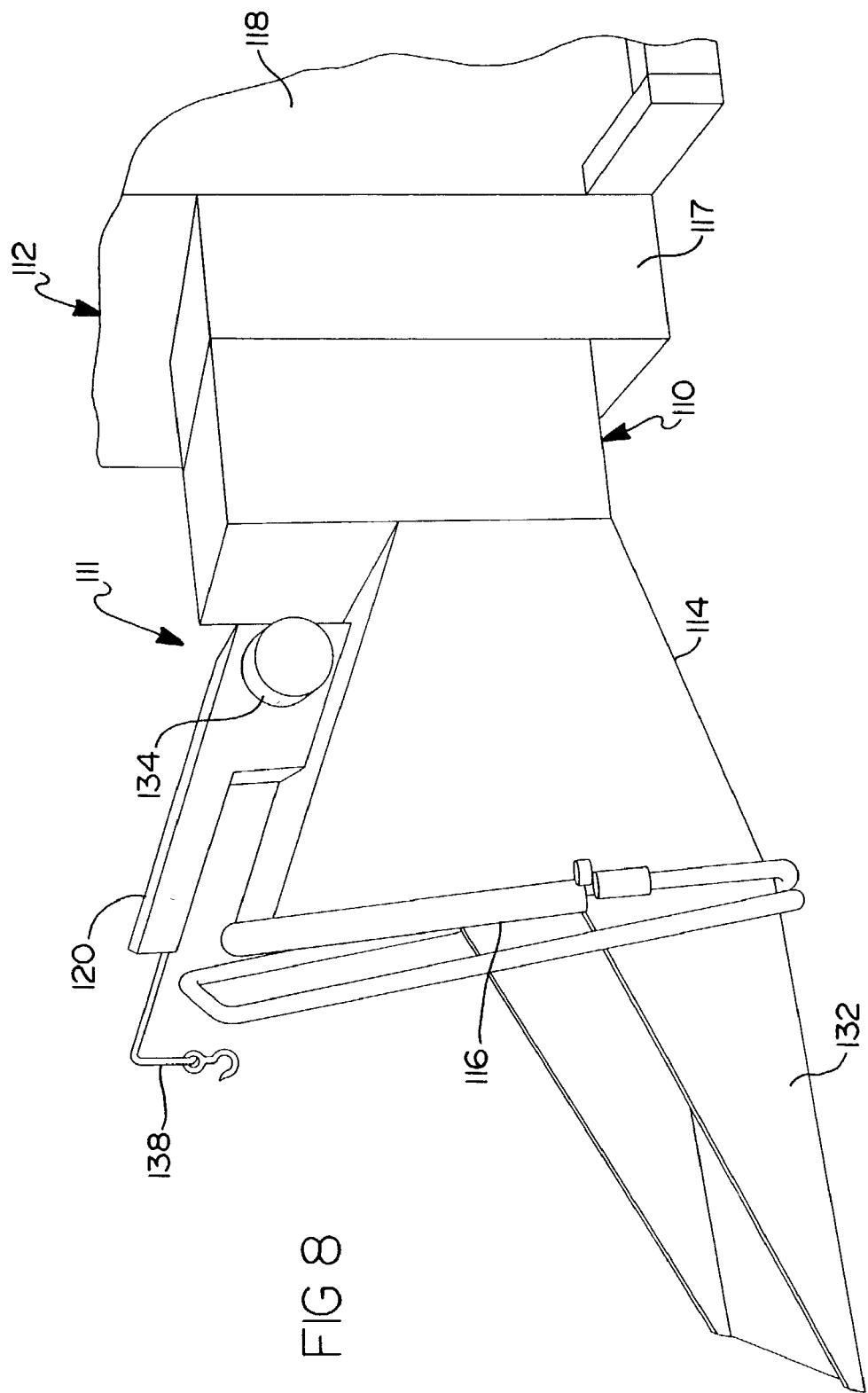
FIG. 8 is a perspective view of a winch assembly, according to the present invention, illustrated in operational relationship with a wood chipper.

Referring to FIG. 8, one embodiment of a winch assembly 111, according to the present invention, is shown for a wood chipper, generally indicated at 112. The wood chipper 112 includes an infeed hopper assembly 114 having an inlet 116 to allow wood material to enter the wood chipper 112. The wood chipper 112 may include a side feed wheel assembly 110 to push or feed wood material to primary feed wheels of a primary feed wheel assembly 117. The wood chipper 112 also includes a primary feed wheel assembly 117 disposed after the infeed hopper assembly 114 and a cutting assembly 118 for rotation about a horizontal axis adjacent to the primary feed wheel assembly 117. The primary feed wheel assembly 117 is used for pulling and pushing the wood material from the infeed hopper assembly 114 to the cutting assembly 118. The cutting assembly 118 includes a rotatable disc or drum (not shown) having a plurality of blades (not shown) operatively connected to the disc or drum for chipping the wood material. It should be appreciated that, except for the side feed wheel assembly 110 and winch assembly 111, the wood chipper 112 is conventional and known in the art. It should also be appreciated that the wood chipper 112 is similar to the wood chipper 12.

Referring to FIG. 8, the winch assembly 111 includes a housing, generally indicated at 120. The housing 120 extends longitudinally and has a generally rectangular shape. The housing 130 is stationary and mounted on the infeed hopper assembly 114 by suitable means such as welding or fastening such as by bolting. The housing 120 extends over an infeed pan 132 connected to the inlet 116 of the infeed hopper assembly 114. The winch assembly 110 also includes a winch 134 having a winch motor 136 (FIG. 9) and a flexible member 138 (e.g., a cable, rope, chain or other type of cable-like structure) attached to the winch 134 that is supported by the housing 120. It should be appreciated that, when the flexible member 138 is attached to an object such as a log (not shown), the winch 134 pulls the object toward the infeed pan 132.

Figure 9:
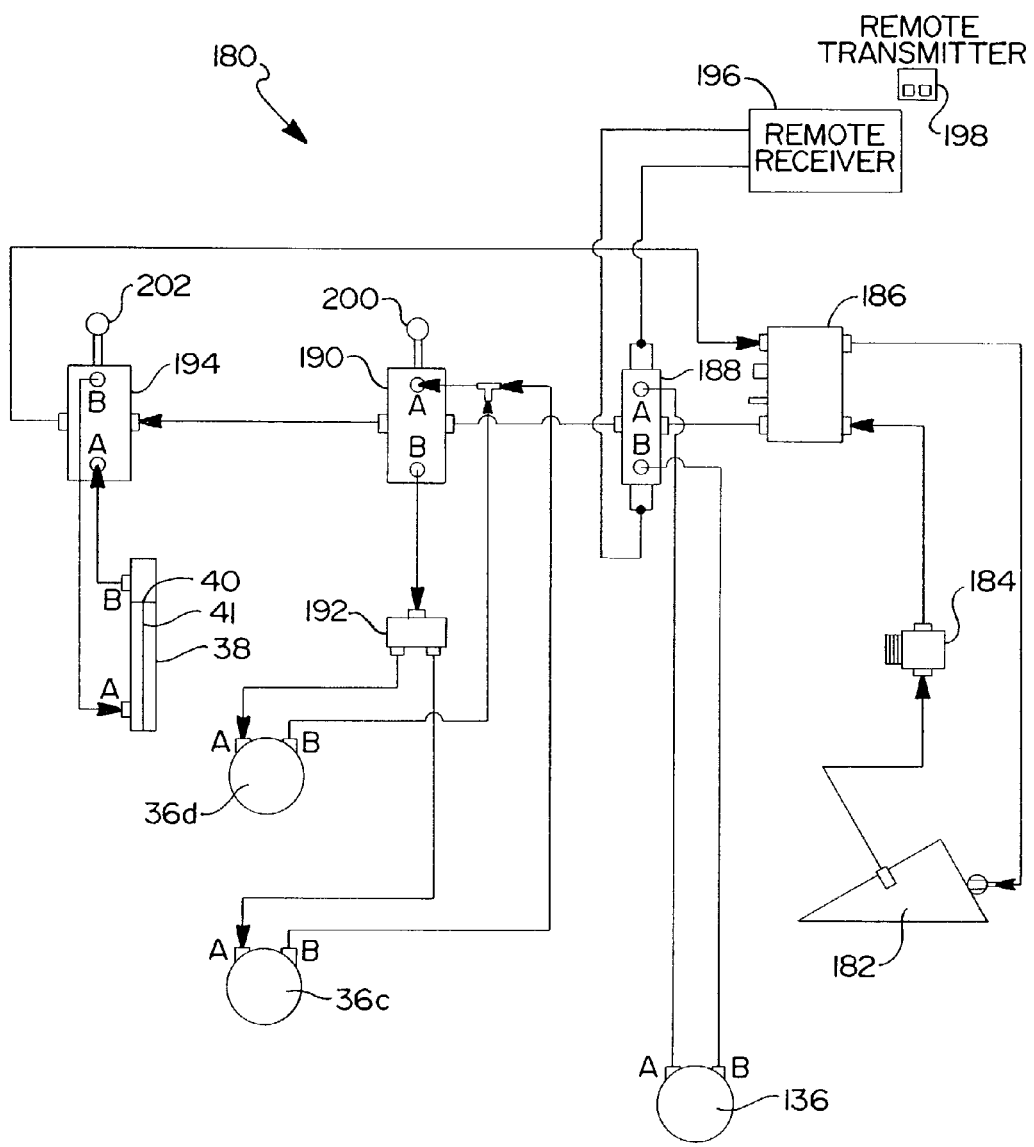
FIG. 9 is a schematic view of a control system, according to the present invention, of the winch assembly of FIG. 1.

Referring to FIG. 9, the wood chipper 112 includes a control system, generally indicated at 180, to control the movement of the primary feed wheel assembly 117, the winch assembly 110, and the yoke lift. The control system 180 includes a storage tank 182 containing hydraulic fluid having an inlet port and an outlet port. The control system 180 further includes a hydraulic pump 184 having an inlet port and an outlet port. The outlet port of the storage tank 182 is fluidly connected to the inlet port of the hydraulic pump 184. It should be appreciated that a pressure relief mechanism (not shown) is typically located on a feed block 186 to be described or be supplied on fluid supply lines as needed.

The control system 180 includes a feed block 186 fluidly connected to the outlet port of the hydraulic pump 184 and to the inlet port of the storage tank 182. The control system 80 also includes a winch motor actuator block 188 fluidly connected to the outlet port of the feed block 186 and to the winch motor 136 for the winch 134.

The control system 180 includes a feed wheel motor block 190 fluidly connected to the actuator block 188. The control system 180 further includes a flow divider 192 fluidly connected to the motor block 190 and each of the hydraulic motors 36c and 36d. It should be appreciated that a return line from the hydraulic motors 36c and 36d is fluidly connected to the motor block 190.

The control system 180 includes a yoke lift block 194 fluidly connected to the motor block 190 and to each end of the cylinder 38 for the yoke lift. It should be appreciated that the yoke lift block 194 controls fluid flow to the ends of the cylinder 38 for moving the piston 40 therein and the yoke 54 attached thereto via the rod 41. It should be appreciated that pressurized fluid from the hydraulic pump 184 flows through supply lines to the hydraulic motors 36c,36d, and returns to the storage tank 182 through return lines. It also should be appreciated that the flow divider 172 divides the fluid flow between hydraulic motors 36c and 36d.

As illustrated in FIG. 9, the control system 180 includes a receiver 196 electrically connected to the actuator block 188 and to a source of power (not shown). The control system 180 also includes a transmitter 198, having a source of power, to send a signal, for example a radio frequency, to the receiver 196. It should be appreciated that the transmitter 198 is of a remote type and could be of a hand-held type, push button type, tether type, etc., to activate the control system 180 to operate components on the infeed area of the wood chipper 12.

In operation of the control system 180, the engine rotates the pump 184 and the pump 184 hydraulically pumps fluid from the storage tank 182 to the feed block 186, which is fed to the actuator block 188, motor block 190, and yoke lift block 194. The operator moves a lever 200 on the actuator block 190 to allow fluid flow to the hydraulic motors 36c and 36d to rotate the primary feed wheels of the primary feed wheel assembly 117. Wood is fed into the inlet 216 of the infeed hopper assembly 214 by an operator and is contacted by the primary feed wheels 36a and 36b. The wood is fed by the primary feed wheels 36a and 36b to the cutting assembly 118. As the cutting assembly 118 rotates and contacts the wood, the wood is cut or chipped into wood chips, which move through the outlet of the cutting assembly 118 and are expelled out of the discharge chute 22. It should be appreciated that the operator moves a lever 202 on the yoke lift block 194 to allow fluid flow to one end of the cylinder 38 to allow an operator to slidably raise and lower the upper housing relative to the lower housing of the primary feed wheel assembly 117.

During operation, the operator uses the transmitter 198 to transmit a signal, which is received by the receiver 196. The receiver 196 sends an electrical signal to the actuator block 188 and activates a solenoid (not shown) therein to allow fluid flow to the winch motor 136 to rotate the winch 134 to release the flexible member 138. The operator pulls on the flexible member 138 and connects it to the object such as wood material away from the infeed pan 132. When the operator uses the transmitter 198 to transmit another signal, which is received by the receiver 196, the receiver 196 sends another electrical signal to the actuator block 188 and activates the solenoid. The solenoid allows fluid flow to the winch motor 136 to rotate the winch 134 in the opposite direction to pull the flexible member 134 toward the infeed pan 132. It should be appreciated that the operator may manually or physically operate a lever or switch to send an electrical signal to the actuator block 188 and activate the solenoid therein to allow fluid flow to the winch motor 136 to rotate the winch 134. It should be appreciated that the transmitter and receiver could be used on the wood chipper 12 to control components of the infeed area such as a powered infeed winch, powered top wheel lift/crush cylinder, powered and crushing movement side feed wheel, complete feed wheel/conveyor feed system, powered folding feed pan or ramp, rear stabilizer legs, loader controls, swivel discharge spout, engine power-take-off engagement, etc.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A remote control assembly for an infeed area of a wood chipper with a cutting assembly adapted for reduction of wood material comprising:
   at least one infeed mechanism associated with the infeed area of the wood chipper and adapted for facilitating movement of the wood material toward the cutting assembly;
   a control system operatively connected to said at least one infeed mechanism; and
   a receiver connected to said control system for receiving a signal and activating said at least one infeed mechanism.

2. A remote control assembly as set forth in claim 1 wherein said at least one infeed mechanism comprises either one of a side feed wheel assembly adapted to be disposed adjacent at least one primary feed wheel of the wood chipper and a winch assembly adapted to be adjacent an infeed hopper of the wood chipper.

3. A remote control assembly as set forth in claim 2 wherein said side feed wheel assembly comprises a side feed wheel and an actuator operatively connected to said side feed wheel for moving said side feed wheel transversely.

4. A remote control assembly as set forth in claim 2 wherein said winch assembly comprises a winch operatively connected to the infeed hopper and having a winch motor and a flexible cable attached to said winch for attachment to the wood material.

5. A remote control assembly as set forth in claim 3 wherein said control system includes an actuator block electrically connected to said receiver and fluidly connected to said actuator to control a direction of fluid flow to said actuator.

6. A remote control assembly as set forth in claim 4 wherein said control system includes an actuator block electrically connected to said receiver and fluidly connected to said winch motor to control a direction of fluid flow to said winch motor.

7. A remote control assembly as set forth in claim 1 including a transmitter for transmitting the signal to said receiver.

8. A remote control assembly as set forth in claim 7 wherein said transmitter is a remotely transportable transmitter for transmitting the signal.

9. A remote control assembly as set forth in claim 6 wherein said control system includes a pump to pump fluid to said actuator block.

10. A wood chipper with a cutting assembly adapted for reduction of wood material comprising:
    at least one infeed mechanism adapted for facilitating movement of the wood material toward the cutting assembly;
    a control system operatively connected to said at least one infeed mechanism;
    a transmitter for transmitting a signal; and
    a receiver connected to said control system for receiving the signal and activating said at least one infeed mechanism.

11. A wood chipper as set forth in claim 10 wherein said at least one infeed mechanism comprises either one of a side feed wheel assembly adapted to be disposed adjacent at least one primary feed wheel and a winch assembly adapted to be disposed adjacent an infeed hopper.

12. A wood chipper as set forth in claim 11 wherein said side feed wheel assembly comprises a side feed wheel and an actuator operatively connected to said side feed wheel for moving said side feed wheel transversely.

13. A wood chipper as set forth in claim 11 wherein said winch assembly comprises a winch operatively connected to the infeed hopper and having a winch motor and a flexible cable attached to said winch for attachment to the wood material.

14. A wood chipper as set forth in claim 12 wherein said control system includes an actuator block electrically connected to said receiver and fluidly connected to said actuator to control a direction of fluid flow to said actuator.

15. A wood chipper as set forth in claim 13 wherein said control system includes an actuator block electrically connected to said receiver and fluidly connected to said winch motor to control a direction of fluid flow to said winch motor.

16. A wood chipper as set forth in claim 13 wherein said transmitter is a remotely transportable transmitter for transmitting the signal.

17. A wood chipper as set forth in claim 11 wherein said control system includes a pump to pump fluid to said actuator block.

18. A wood chipper comprising:

an infeed hopper;

a rotatable cutting assembly spaced from said infeed hopper and adapted for reducing wood material;

at least one primary feed wheel disposed between said infeed hopper and said cutting assembly;

at least one side feed wheel disposed adjacent said at least one primary feed wheel; and a winch assembly disposed adjacent said infeed hopper including a winch;

a mechanism for either moving said at least one side feed wheel transversely relative to said at least one primary feed wheel to thereby facilitate movement of the wood material toward said rotatable cutting assembly and for rotating said winch to thereby facilitate movement of the wood material toward said rotatable cutting assembly;

a control system operatively connected to said mechanism;

a transmitter for transmitting a signal; and a receiver connected to said control system for receiving the signal and activating said mechanism.

* * * * *